W. R. BENSON.
SHEEP SHEARING MACHINE.
APPLICATION FILED FEB. 19, 1917.
1,318,831.
Patented Oct. 14, 1919.
2 SHEETS—SHEET 2.
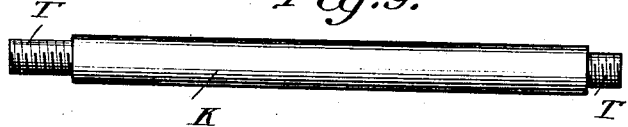
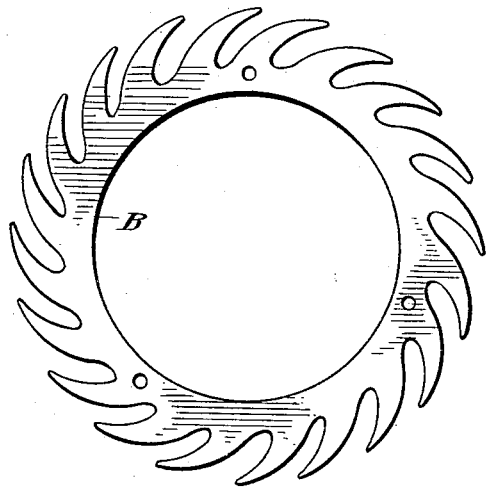
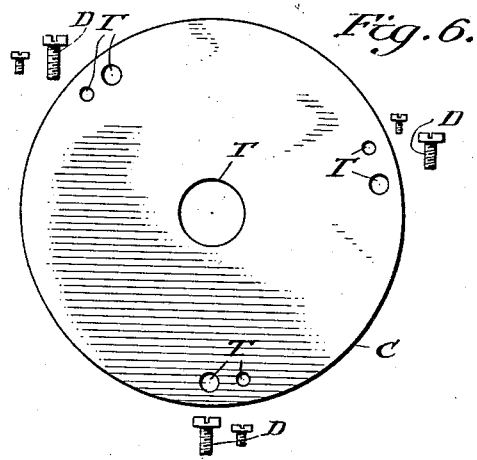
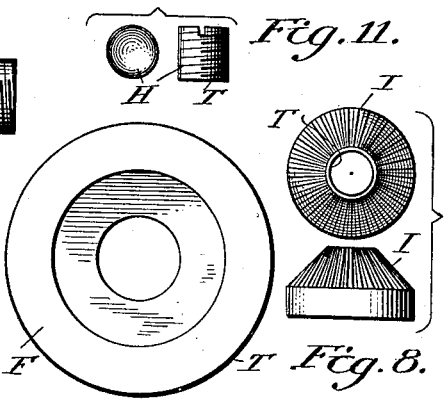
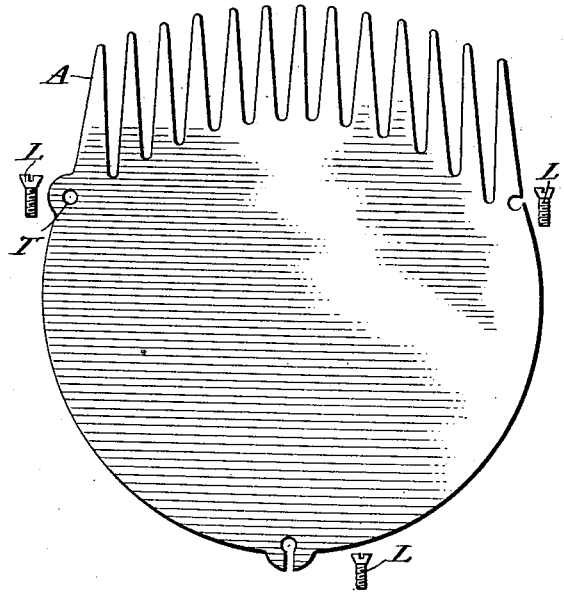
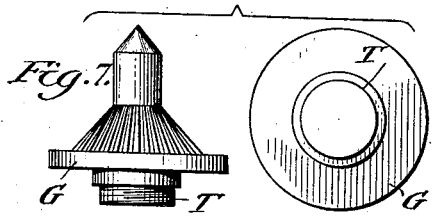
Inventor:
W. R. Benson
by
T. K. Bryant
Atty

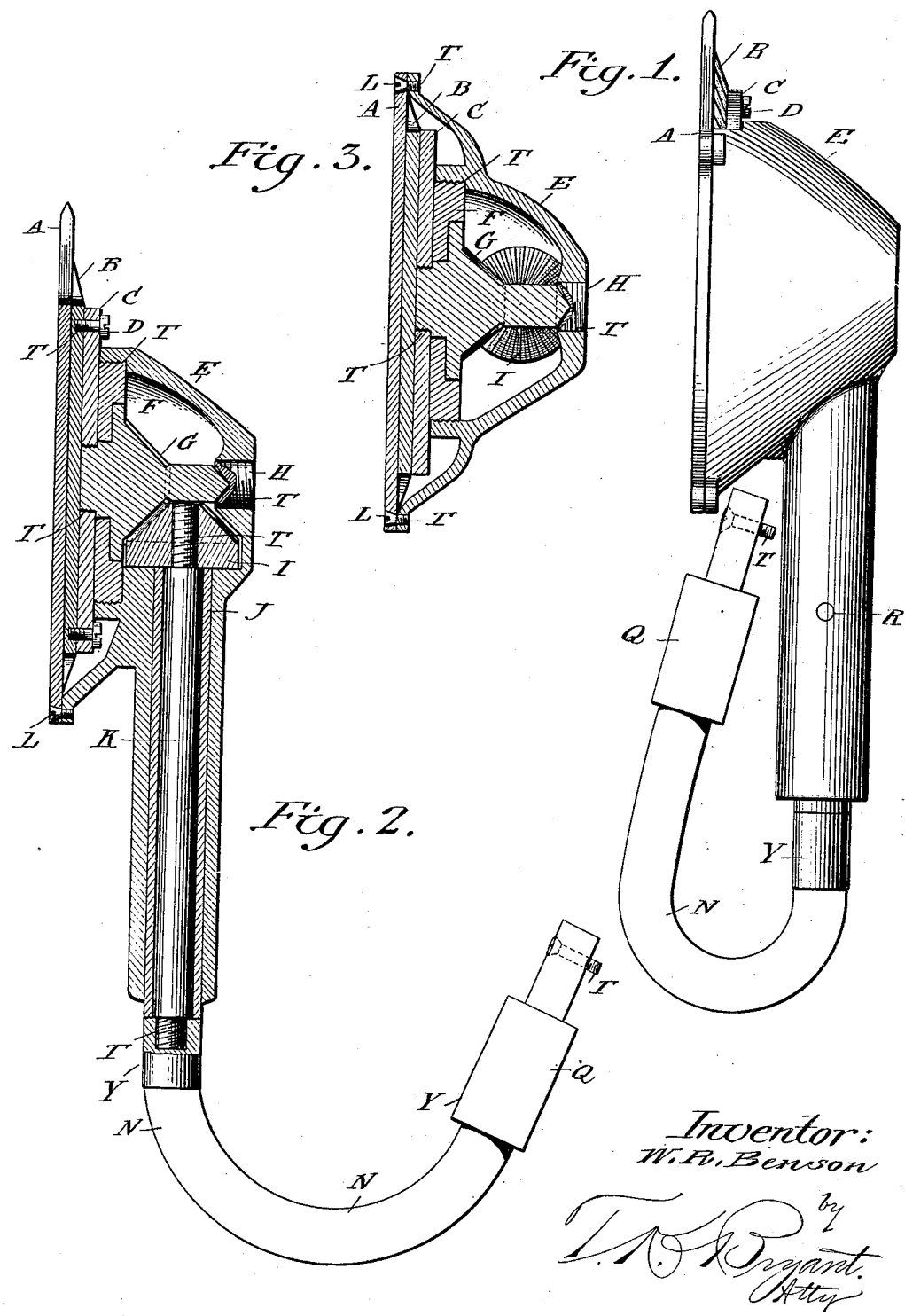

UNITED STATES PATENT OFFICE.

WILLIS ROSCOE BENSON, OF OAKLEY, IDAHO.

SHEEP-SHEARING MACHINE.

1,318,831. Specification of Letters Patent. Patented Oct. 14, 1919.

Application filed February 19, 1917. Serial No. 149,680.

*To all whom it may concern:*

Be it known that I, WILLIS ROSCOE BENSON, of Oakley, county of Cassia, State of Idaho, have invented a new and useful Sheep-Shearing Machine, to be known as the Benson sheep-shearing machine, and that the same has not been patented in any country.

The nature of my invention consists of an appliance or machine to be used for the purpose of shearing the wool from sheep. It will be operated by attaching the same to a power supplying source and by an individual guiding and controlling the machine.

In the drawings,

Figure 1 is an elevational view of the invention,

Fig. 2 is a longitudinal central sectional view thereof,

Fig. 3 is a transverse sectional view of the same,

Fig. 4 is an elevational view of the comb employed,

Fig. 5 is an elevational view of the cutter,

Fig. 6 is a view of the cutter disk and its screws,

Fig. 7 shows the cutter dog and bearing,

Fig. 8 shows the spindle gear,

Fig. 9 is a side view of the spindle,

Fig. 10 is a side view of the bushing and

Fig. 11 shows the gear bearing cup.

In order that the invention and machine may be clearly and thoroughly understood, the following detailed explanation is given.

The machine is to be constructed of steel with the exception of the covering of the "hull" which will be constructed of aluminum, which covering is designated by the letter "E" in all three figures on Sheet I of the drawings. The base of the machine consists of a steel plate circular in shape with 13 teeth or projections extending from one side a little over an inch, the upper side of which projections are ground to a sharp edge. This plate A is called the "comb" and is fastened to the aluminum covering E above mentioned by means of screws L. Above this "comb" A and made to revolve on the same is the cutter B, which cutter consists of a rim of steel in the form of a circle, on the outside of which appear twenty curved projections pointing in a uniform direction, and ground to a sharp edge. This cutter B is fastened by means of three screws D to the "disk" C immediately above. This disk consists of a flat circular piece of steel with a small opening in the center on the edge of which opening are threads by means of which the disk is fastened to the lower end T of the cutter cog and bearing G. The upper end of this cutter cog G which stands in a perpendicular position fits and runs in the "cog bearing cup" H in the apex of the hull or shell E and in the bearing F at the opposite end of the shell E. At right angles to the cutter cog G and extending horizontally therefrom are the "spindle cog" I and "spindle" K. The threads T on the end of the spindle K serve to fasten the same to the "spindle cog" I which meshes with the cutter cog G. The spindle K revolves in a hollow steel cylinder I. A nut Y is fastened by means of threads on the outward end of the spindle K. This nut L then connects with a coil spring N which in turn is fastened to a steel coupling marked "Q" on the drawings. The machine will be operated by applying power to the coupling "Q" to cause the same to revolve. This motion will be communicated to the spring "N" and then to the spindle K and spindle cog I. The spindle cog I operating in the cutter cog G will transfer the motion directly to the cutter B which will be made to revolve from left to right on the comb A.

What I claim as my invention and desire to secure by Letters Patent, is—

A sheep-shearing machine comprising an inverted substantially cup-shaped bonnet having a spindle bearing extending laterally from one side thereof, a horizontal spindle journaled in said bearing projecting into said bonnet and having a bevel gear secured thereon, a second bevel gear in said bonnet below and meshing with the first-named gear and having a vertical spindle extending from each side thereof, an apertured bearing plate secured transversely in the lower portion of said bonnet through which one of the last-named spindles is journaled and upon which the second bevel gear rests, a rotatable toothed cutter secured to the lower end of the last-named spindle beneath said apertured bearing plate, a stationary comb plate coöperating with said cutter and secured to the bottom of said bonnet beneath said cutter, and an adjustable thrust bearing extending through the top of said bonnet and engaging the other of the last-named spindles whereby said cutter may be maintained in intimate contact with said comb plate with sufficient pressure to insure proper cutting relation between the same.

Dated at Oakley, Idaho, February 14th, 1917.

WILLIS ROSCOE BENSON.

Witnesses:
JOHN BENSON,
GEO. W. HORDEY.

Copies of this patent may be obtained for five cents each, by addressing the "Commissioner of Patents, Washington, D. C."